UNITED STATES PATENT OFFICE.

PETER HUFF, OF FLOYD, VIRGINIA.

FERTILIZER.

SPECIFICATION forming part of Letters Patent No. 576,848, dated February 9, 1897.

Application filed November 27, 1896. Serial No. 613,658. (No specimens.)

*To all whom it may concern:*

Be it known that I, PETER HUFF, a citizen of the United States, residing at Floyd, in the county of Floyd and State of Virginia, have invented a certain new and useful Improvement in Composition of Matter; and I do declare the following to be a full, clear, and exact description of the invention, such as will enable others skilled in the art to which it appertains to make and use the same.

My invention consists in a certain new and useful composition of matter designed to protect corn when planted from the ravages of worms, bugs, insects, crows, and fowls and birds generally, and also causes it to germinate more rapidly and sends it forth in a vigorous and healthy condition.

The composition will be hereinafter fully described and claimed.

My composition consists of the following ingredients, viz: coal-tar, brimstone, soft soap, saltpeter, lime, and plaster, the proportions of each ingredient being varied according to the nature of the soil, with which it is mixed where the corn is to be planted.

This composition acts as a fertilizer as well as protecting the corn against the attacks of insects, birds, fowls, worms, &c.

What I claim, and desire to secure by Letters Patent, is—

The herein-described composition of matter to be used for protecting and fertilizing corn, consisting of the following ingredients, coal-tar, brimstone, soft soap, saltpeter, lime, and plaster, in suitable proportions.

In testimony whereof I affix my signature in presence of two witnesses.

PETER HUFF.

Witnesses:
 WINFIELD SCOTT,
 A. M. HARRIS.